United States Patent
Renaudin et al.

(10) Patent No.: US 10,922,442 B2
(45) Date of Patent: Feb. 16, 2021

(54) ELECTRONIC CIRCUIT SECURED BY DISRUPTION OF ITS POWER SUPPLY

(71) Applicant: TIEMPO, Montbonnot St-Martin (FR)

(72) Inventors: Marc Renaudin, Biviers (FR); Christophe Scarabello, Gières (FR)

(73) Assignee: TIEMPO, Montbonnot St-Martin (FR)

( * ) Notice: Subject to any disclaimer, the term of this patent is extended or adjusted under 35 U.S.C. 154(b) by 243 days.

(21) Appl. No.: 15/957,102

(22) Filed: Apr. 19, 2018

(65) Prior Publication Data
US 2018/0307865 A1 Oct. 25, 2018

(30) Foreign Application Priority Data

Apr. 19, 2017 (FR) .................................... 17 53407

(51) Int. Cl.
| | |
|---|---|
| *G06F 11/00* | (2006.01) |
| *G06F 12/12* | (2016.01) |
| *G06F 12/16* | (2006.01) |
| *G08B 23/00* | (2006.01) |
| *G06F 21/75* | (2013.01) |
| *G06F 12/14* | (2006.01) |

(52) U.S. Cl.
CPC .................................. *G06F 21/755* (2017.08)

(58) Field of Classification Search
CPC ............................................... G06F 21/70–75
See application file for complete search history.

(56) References Cited

U.S. PATENT DOCUMENTS

| | | | | |
|---|---|---|---|---|
| 5,117,380 A | * | 5/1992 | Tanagawa ............... | G06F 7/588 708/251 |
| 6,419,159 B1 | * | 7/2002 | Odinak ............... | G06K 19/073 235/492 |
| 6,594,760 B1 | * | 7/2003 | Ryan, Jr. ................. | G06F 21/72 713/189 |
| 7,389,316 B1 | * | 6/2008 | Baetoniu ................... | G06F 1/02 708/250 |

(Continued)

FOREIGN PATENT DOCUMENTS

FR        2958098 A1    9/2011

OTHER PUBLICATIONS

S. Yang, P. Gupta, M. nWolf, D. Serpanos, V.Narayanan, Y. Xie, Power Analysis Attack Resistance Engineering by Dynamic Voltage and Frequency Scaling. ACM Transactions on Embedded Computing Systems, 2012.*

*Primary Examiner* — Michael S McNally
*Assistant Examiner* — Vadim Savenkov
(74) *Attorney, Agent, or Firm* — Oliff PLC

(57) ABSTRACT

The electronic circuit comprises a logic module performing a first function. A number generator generates a series of first numbers. A voltage generator supplies the logic module with a first minimum operating voltage of the logic module and a variable additional second voltage having electrical characteristics that are functions at least of the first series of first numbers. The variable additional second voltage comprises at least a fixed voltage defined by an offset voltage value and a first periodic voltage defined at least by a first frequency and a first amplitude. The voltage generator is configured so that the value of the offset voltage, of the first frequency and/or of the first amplitude are defined at least from the series of first numbers.

15 Claims, 2 Drawing Sheets

(56) References Cited

U.S. PATENT DOCUMENTS

| | | | |
|---|---|---|---|
| 8,296,577 B2* | 10/2012 | Shu | G06F 9/3001 |
| | | | 713/189 |
| 9,755,822 B2* | 9/2017 | Han | G06F 1/30 |
| 2003/0154389 A1* | 8/2003 | Peeters | G06K 7/0086 |
| | | | 713/193 |
| 2004/0143747 A1 | 7/2004 | Eckstein et al. | |
| 2006/0156039 A1 | 7/2006 | Deveaud et al. | |
| 2006/0280307 A1* | 12/2006 | Ikushima | H04L 9/0838 |
| | | | 380/277 |
| 2009/0268901 A1* | 10/2009 | Lodewyck | H04L 9/0852 |
| | | | 380/41 |
| 2011/0252244 A1* | 10/2011 | Lesea | G06F 21/72 |
| | | | 713/192 |
| 2012/0170742 A1* | 7/2012 | Bosco | G06F 21/755 |
| | | | 380/252 |
| 2013/0015900 A1* | 1/2013 | Lisart | H03K 3/84 |
| | | | 327/306 |
| 2014/0181986 A1* | 6/2014 | Guo | G06F 21/10 |
| | | | 726/26 |
| 2014/0201851 A1* | 7/2014 | Guo | H04L 9/0866 |
| | | | 726/34 |
| 2014/0253505 A1* | 9/2014 | Vincent | G06F 21/83 |
| | | | 345/174 |
| 2015/0195082 A1* | 7/2015 | Han | G06F 21/755 |
| | | | 713/189 |
| 2017/0364710 A1* | 12/2017 | Sandhu | G06F 21/75 |
| 2020/0004992 A1* | 1/2020 | Chong | G09C 1/00 |

* cited by examiner

ELECTRONIC CIRCUIT SECURED BY DISRUPTION OF ITS POWER SUPPLY

BACKGROUND OF THE INVENTION

The invention relates to an electronic circuit which is better protected against external attacks, for example covert channel attacks.

STATE OF THE ART

In order to ensure maximum security in a wide range of fields and in particular in data transmission, the data is encrypted. It is input in clear manner on the input of the encryption circuit and is output in unintelligible form. One way of retrieving data that has been encrypted is to guess the code used to encrypt this data.

However, it is not always possible to perform this operation as it is necessary to possess large quantities of data to be able to guess the hidden data and/or the encryption algorithms. One countermeasure can be to analyse how the encryption circuit works. There again, numerous protective measures exist to prevent this integrated circuit from being opened in order to guess how it works.

Several strategies have been set up in order to guess how the encryption circuit functions by applying a known signal on input and observing the output signal and numerous quantities linked to the operation of the encryption circuit, for example its electrical consumption and electromagnetic radiation. It is then possible to guess how functional blocks used to transform the input signal into an encrypted output signal operate.

In order to increase the security of the data integrated in asynchronous electronic circuits, it has been proposed to modify the power supply conditions of these circuits.

For example, the document US 2004/0143747 proposes to supply an asynchronous circuit with a randomly variable power supply. The object of this configuration is to thwart covert channel attacks by preventing reliable data from being retrieved by means of measuring devices synchronised with the asynchronous circuit.

The document proposes to use a noise source which feeds a number generator. The number generator feeds a digital-to-analog converter which provides data to a voltage regulator. In this way, depending on the signal emitted by the number generator, the voltage regulator provides a supply voltage which varies at the terminals of the asynchronous circuit. If the number generator is a random number generator, the supply voltage can then have a random component.

The document US 2006/0156039 also proposes to modify the power supply conditions of the asynchronous circuit randomly in order to make processing of the data inside the asynchronous circuit more difficult.

It is also proposed in the document U.S. Pat. No. 6,698,662 to add a current consumption module which is supplied by the same current source as the circuit to be protected. This current consumption module is configured to consume current in random manner so that analysis of the electrical consumption originating from the voltage or current supply is correlated as least as possible to the operation of the circuit to be protected. This solution is particularly complicated to implement as it requires active components to be added to the integrated circuit which increases the surface of the circuit and its consumption.

The document US 2003/0154389 also proposes to apply a fluctuating voltage to the terminals of a circuit to be protected. This fluctuating voltage is applied by means of a random number generator which delivers numbers to a digital-to-analog converter then delivering a random voltage. This random voltage is applied to a current regulator which makes the power supply of the circuit to be protected fluctuate. A substantially equivalent teaching is provided by the document FR 2958298. The document U.S. Pat. No. 6,419,159 proposes to activate current sinks randomly by means of a random number generator. The object of these random connections is to mask the current consumption differences during operation of the processor.

OBJECT OF THE INVENTION

One object of the invention consists in remedying these shortcomings and in providing an electronic circuit which is more efficient than devices of the prior art in order to thwart covert channel attacks.

It is particularly advantageous to provide an electronic circuit comprising:
  a first logic module configured to perform a first function,
  a number generator configured to generate at least one series of successive first numbers over a first time period,
  a voltage generator connected to the number generator so as to receive a first series of successive data representative of the series of first numbers, the voltage generator being configured to provide the first logic module with a first supply voltage higher than a minimum operating voltage of the first logic module and a variable additional second voltage having electrical characteristics which are at least a function of the first series of consecutive data.

The electronic circuit is remarkable in that the voltage generator is configured so as to deliver a variable additional second voltage which comprises at least:
  a component representative of a fixed voltage defined by an offset voltage value,
  a component representative of a first periodic voltage defined at least by a first frequency and a first amplitude.

The voltage generator is configured so that the value of the offset voltage, the first frequency and/or first amplitude are defined at least from the series of first numbers, over the first time period, taken from a first series of offset voltages comprising several different offset voltage values, a second series of first frequencies comprising several different first frequency values and a third series of first amplitudes comprising several different first amplitude values.

In one development, the voltage generator is configured so as to deliver a variable additional second voltage which comprises in addition a component representative of a second periodic voltage defined at least by a second frequency and a second amplitude and the voltage generator is configured in such a way that the second frequency and/or second amplitude are defined at least from the series of first numbers, over the first time period, taken from several second frequencies and second amplitudes.

In advantageous manner, the voltage generator is configured so that the component representative of the first periodic voltage presents an phase shift with the component representative of the second periodic voltage and the voltage generator is configured so that the phase shift is defined at least from the series of first numbers, over the first time period, taken from several phase shifts.

In a particular embodiment, the voltage generator is configured to deliver a component representative of the first periodic voltage which presents a first waveform different from a second waveform of the component representative of the second periodic voltage, the first waveform and second waveform being advantageously chosen from a sinusoidal signal, a square signal, a triangular signal, a trapezoid signal, a saw-tooth signal, an exponential signal and a logarithmic signal.

It is advantageous to provide for the voltage generator to be configured to deliver a component representative of the first periodic voltage which presents a first duty cycle and for the voltage generator to be configured so that the first duty cycle is defined at least from the series of first numbers, over the first time period, taken from several different duty cycles.

In another embodiment, the first series of offset voltages comprises a zero value or the third series of first amplitudes comprises a zero value.

Preferentially, the number generator is supplied by the voltage generator and the first supply voltage is higher than a minimum operating voltage of the number generator.

Advantageously, the number generator is connected to a register, the register being configured to transform a number received from the number generator into an address of a memory area storing one or more of the electrical characteristics of the random additional second voltage.

In particular manner, the number generator is a random number generator.

In an alternative embodiment, the number generator is engineered in asynchronous logic and preferentially in asynchronous logic insensitive to delays.

In a particular embodiment, the number generator is configured so that the time period separating emission of two consecutive numbers is a function of the power supply conditions at its supply terminals.

Advantageously, the first logic module is provided with a delay generator configured to insert a delay in the data processing by the first logic module so as to dissociate the total processing time of said data and the power supply conditions of the first logic module.

In another particular embodiment, the electronic circuit comprises a clock generator configured to generate a clock signal, the clock generator being connected to the number generator and/or to the voltage generator so as to receive data relative to the numbers generated by the number generator and to adjust the frequency of the clock signal to the power supply conditions of the synchronous logic circuit, the logic circuit being a synchronous circuit synchronised by said clock signal.

In a specific development, the voltage generator comprises a low-dropout voltage regulator provided with a first transistor having an input terminal designed to be connected to a power supply source and an output terminal connected to supply the first logic module, the first transistor having a control electrode connected to the output of an amplifier, the amplifier having a first input terminal receiving a periodic signal from a periodic signal generator configured to adjust a frequency of said periodic signal by means of a first data item received on a first input terminal and an amplitude of said periodic signal by means of a second data item received on a second input terminal, the amplifier having a second input terminal receiving a voltage from a voltage supply, the voltage supply being configured to adjust the value of the delivered voltage according to a third data item.

In alternative manner, the voltage generator comprises a DC-DC chopper provided with a first transistor having an input terminal designed to be connected to a power supply source and an output terminal connected to supply the first logic module, the first transistor having a control electrode connected to the output of a periodic signal generator configured to modify a frequency of said periodic signal by means of a first data item received on a first terminal and a mean voltage of said periodic signal by means of a second data item received on a second terminal, the output terminal of the first transistor being connected to the first logic module by means of an inductor and a filter configured to modify the amplitude of the voltage delivered by the first transistor by means of a third data item received on a control terminal of the filter.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

Figure 1:
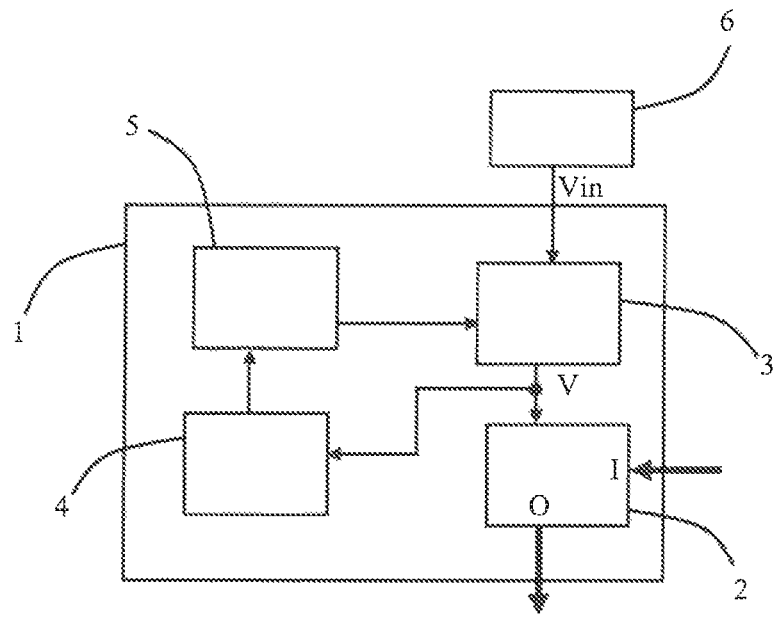
FIG. 1 illustrates an embodiment of an electronic circuit according to the invention, in schematic manner.

As illustrated in FIG. 1, the electronic circuit or integrated circuit 1 comprises a logic circuit 2, also called logic module, which can be a synchronous circuit or an asynchronous circuit. The integrated circuit 1 can also comprise at least one logic circuit 2, i.e. a first logic circuit 2, and at least a second logic circuit (not shown). The logic circuit 2 is configured to perform a first function which corresponds to data processing with transformation of the data between the input I and output O. The logic circuit 2 is configured to receive a first series of data, to process the first series of data and to provide a second series of data to one or more circuits to be monitored. The logic circuit 2 is for example of a data encryption circuit. The algorithms used in a logic function 2 have to be protected against external attacks. The logic circuit 2 can be exclusively in digital logic or it can also contain some analog functionalities. In a particular embodiment, the logic circuit 2 can be a purely analog circuit.

If the logic circuit 2 is an asynchronous circuit, the latter then does not have a global clock signal which governs or coordinates the different functions which exist inside the asynchronous circuit.

The asynchronous circuit can be an asynchronous circuit with time hypotheses. However, it is particularly advantageous to provide for the asynchronous circuit to be insensitive to delays or almost insensitive to delays, which enables a robust operation to be had under all power supply conditions.

In order to protect the logic circuit 2 against external attacks seeking to discover the functions and/or secrets of the logic circuit 2 by analysing its electrical consumption and/or the emission of an electromagnetic radiation, the logic circuit 2 is supplied by a power supply circuit which is configured to apply a variable power for example a variable supply voltage V and/or a variable supply current.

A variable supply voltage V is fed to the logic circuit 2 during a first time period which is used to perform the functions of the logic circuit 2, for example a data encryption function. During this first time period, the electrical characteristics of the supply voltage V will fluctuate which will introduce a variable component into the measurements made by outside parties studying the logic function 2.

The variable supply voltage V can be broken down into addition of a first voltage necessary for correct operation of the logic circuit 2 and of a second voltage which contains the variable component which introduces a power supply noise.

The power supply circuit comprises at least one voltage generator 3 configured to deliver a first supply voltage higher than a minimum operating voltage of the first logic circuit 2. In other words, the voltage generator 3 is configured to deliver a minimum power supply level, i.e. a minimum voltage value below which the logic circuit 2 is non-operational or operates with a too slow speed to be able to be used. The minimum voltage ensures that the logic circuit is able to process the supplied data within a predefined time.

The voltage generator 3 is also configured to deliver a variable additional second voltage which will generate a variable power supply noise. The variable second voltage comprises electrical characteristics which fluctuate during the first time period.

By introducing a variable noise level in the power supply of the logic circuit 2, the integrated circuit 1 introduces a disruption which will modify the operation of the logic circuit 2 in its electrical consumption and in its electromagnetic radiation. This disruption will introduce modifications in the instantaneous power consumed in addition to the instantaneous consumption linked to processing of the first series of data. The same is the case for the electromagnetic signature which comprises a component linked to processing of the data and a component linked to the variable disruption.

In one embodiment, the voltage generator 3 is configured to deliver a variable voltage which comprises at least a fixed component, i.e. a fixed voltage defined by its offset voltage VO, and a periodic component, i.e. a voltage defined by its frequency F, its amplitude VA and its waveform. These two components can be present in a single periodic component which, in addition to the previous characteristics, comprises the offset voltage VO. Devices of the prior art only propose fluctuation of the value of the supply power in the form of a succession of steps as illustrated in the documents U.S. Pat. No. 6,419,159 and US 2003/0154389. The inventors observed that the use of a periodic component with a variable amplitude and/or a variable frequency makes the possibilities of detection and determination from outside the circuit much more complex. The supply voltage fluctuates between two successive generations of numbers.

The integrated circuit 1 is configured so as to make at least one of these electrical characteristics of the supply voltage fluctuate during the first time period. In advantageous manner, at least two or three electrical characteristics are modified during the first time period. Even more advantageously, all the electrical characteristics are modified during the first time period.

In order to modify the electrical characteristics of the variable additional second voltage, the voltage generator 3 is associated with a number generator 4 which is advantageously a random number generator. The number generator 4 is configured to generate at least one series of successive first numbers during the first time period. The generator 4 delivers one number after the other during the first time period. As an alternative, the generator 4 can be configured to deliver a first group of numbers simultaneously and then a second group of numbers simultaneously and so on during the first time period. The generator 4 can generate several series of numbers in parallel, for example a series of first numbers and a series of second numbers during the first time period. If the generator is a random number generator 4, the latter is configured to randomly generate at least one series of successive first numbers during the first time period.

The number generator 4 is configured to generate numbers periodically or in aperiodic manner during the first time period. In advantageous manner, the number generator 4 is non-predictive in the time separating two successive numbers or two successive series of numbers.

The number generator 4 delivers numbers which are applied with or without transformation on one or more input terminals of the voltage generator 3. In this way, the voltage generator 3 delivers a variable additional second voltage having electrical characteristics which are functions at least of the first series of consecutive data representative of the series of first numbers. The electrical characteristics of the additional second voltage thus fluctuate according to the generated numbers. If the number generator 4 is a random number generator, the additional second voltage is modified randomly in its components.

The voltage generator 3 is configured so that the additional second voltage comprises a fixed voltage which is added to the minimum power supply level.

The value of this fixed voltage or offset voltage VO is defined by means of a first series of offset voltages VO comprising several different values of offset voltages VO. In this way, the voltage generator 3 is configured so that the value of the offset voltage VO is defined at least from the series of first numbers, over the first time period, taken from the first series of offset voltages comprising several different offset voltages values VO.

The voltage generator 3 is configured so that the additional second voltage comprises a periodic voltage which is added to the minimum power supply level. This periodic noise component is defined by several electrical characteristics which will fluctuate in time independently from one another according to the numbers generated by the number generator 4.

In an advantageous embodiment, the voltage generator 3 is configured to deliver a first periodic voltage which is defined by a first frequency F, a first amplitude VA and a first waveform. The value of the first frequency F is defined by a second series of first frequencies F comprising several different values of first frequencies F. The value of the first amplitude VA is defined by a third series of first amplitudes VA comprising several different values of first amplitudes VA.

The voltage generator 3 is configured so that the first frequency F and/or first amplitude VA are defined at least from the series of first numbers, over the first time period, taken from the second series of first frequencies F comprising several different values of first frequencies F and the third series of first amplitudes VA comprising several different values of first amplitudes VA.

In a first embodiment, the voltage generator 3 is configured to only deliver a single waveform for the first periodic voltage. The waveform is advantageously chosen from a sinusoidal signal, a square signal, a triangular signal, a trapezoid signal, a saw-tooth signal, an exponential signal and a logarithmic signal, but other waveforms are possible.

As an alternative, the voltage generator 3 is configured to vary the waveform of the first periodic voltage among the waveforms set out above according to the numbers generated by the number generator 4.

In a preferential embodiment, the voltage generator 3 is configured to further deliver a second periodic voltage which is defined by a second frequency F, a second amplitude VA and a second waveform. In this configuration, it is advantageous to provide for the voltage generator 3 to also be configured to make the phase shift value between the first periodic voltage and the second periodic voltage vary when the voltage generator 3 is configured so that the first frequency F is equal to the second frequency F.

In the same way as for the first periodic voltage, the voltage generator 3 is configured so that the second frequency F and/or the second amplitude VA are defined at least from the series of first numbers, over the first time period, taken from several second frequencies F and second amplitudes VA. The second frequencies F can be defined from the second series or from a fourth series different from the second series. The second amplitudes VA can be defined from the third series or from a fifth series different from the third series.

In one embodiment, the voltage generator 3 is configured to only deliver a single waveform for the first periodic voltage or for all the periodic voltages. The waveform is advantageously chosen from a sinusoidal signal, a square signal, a triangular signal, a trapezoid signal, a saw-tooth signal, an exponential signal or a logarithmic signal.

As an alternative, the voltage generator 3 is configured to only make the waveform of the first periodic voltage vary among the waveforms set out above according to the numbers generated by the number generator 4. It is further possible to provide for the voltage generator 3 to be configured to make the waveform of all the periodic voltages vary among the waveforms set out above according to the numbers generated by the number generator 4. Finally, it is advantageous to provide for the voltage generator 3 to be configured to make the waveform of the different periodic voltages vary independently among the waveforms set out above according to the numbers generated by the number generator 4.

As indicated in the foregoing, it is advantageous to provide for the value of the phase shift between the first periodic voltage and the second periodic voltage to be able to vary according to the numbers generated by the number generator 4. The offset can vary between 0 and formation of two signals in phase opposition. It is possible to provide for the first periodic voltage to be leading or lagging with respect to the second periodic voltage.

In an advantageous embodiment, the first series of offset voltages VO comprises at least a zero voltage and other values. In this way, when the voltage is zero, the voltage generator 3 does not deliver the fixed voltage component. It is therefore possible, during a part of the first time period, for the voltage generator 3 not to deliver the fixed voltage component.

It is also advantageous to provide for the second series of first frequencies F and/or the third series of first amplitudes VA to be able to comprise a zero value or another value representative of a lack of delivery of the first periodic voltage. The same can be the case for the second periodic voltage.

In addition to the electrical characteristics set out in the foregoing, the first periodic voltage is defined by a first duty cycle. It is advantageous to provide for the voltage generator 3 to be configured to adjust the first duty cycle of the first periodic voltage according to the numbers generated by the number generator 4. In other words, the voltage generator 3 is configured so that the first duty cycle is defined at least from the series of first numbers of the number generator 4, over the first time period, taken from several different duty cycles. In a periodic signal, the duty cycle corresponds to the ratio between the time of the signal in a certain state during a period over the duration of this same period. For example, for a square signal, the duty cycle corresponds to the time spent in high or low state during a period over the duration of the period. For a sinusoidal signal, the duty cycle can correspond to the duration of the signal above or below its mean value over the duration of the period.

The different characteristics of the additional second voltage are modifiable on-the-fly, i.e. while the logic circuit 2 is in operation, so that all these variations made on the power supply of the logic circuit 2 modify the instantaneous consumption of the logic circuit 2. In advantageous manner, the logic circuit is configured so that modulation of its power supply conditions results in a modification of its processing speed of the supplied data and therefore of the data processing time. The higher the voltage, the faster the processing speed.

It is therefore more difficult for an outsider to find out how the logic circuit 2 works. As the number generator 4 emits numbers, the voltage generator 3 continuously modifies the power supply conditions according to the numbers received or according to the received data representative of the generated numbers. For example, the number generator 4 emits one or more numbers approximately every microsecond.

In a particular embodiment, the data provided by the number generator 4 can be an analog voltage or a digital value formed by bits.

The number generator 4 is connected to a processing circuit 5 which advantageously comprises one or more registers. The number generator 4 is connected to at least one register and provides a data item which corresponds to an address of the register. The register is configured to transform a number received from the number generator 4 into an address of a memory area storing one or more electrical characteristics of the variable additional second voltage.

According to the data received, and therefore to the register involved, the processing circuit 5 will provide a second data item to the voltage generator 3. This second data item corresponds to one or more electrical characteristics of the additional second voltage.

In one embodiment, the data item recorded in the register corresponds to a value of an electrical characteristic, for example the amplitude VA, frequency F, phase shift or value of the offset voltage VO. The electrical parameters are modified one by one, consecutively in time, and in preferential manner the electrical parameters are modified in random manner.

As an alternative, the data recorded in the register corresponds to a complete set of the electrical characteristics of the additional second voltage. The electrical parameters are modified in groups consecutively and preferentially randomly.

In a first particular embodiment, the number generator 4 is configured to deliver at least 4096 different numbers and the register is configured to store at least 4096 different conditions spread over the different electrical characteristics of the additional second voltage. The protection is greater the higher the number. In this way, it is possible to form more than 4096 different signals. In advantageous manner, a signal is coded on at least four bits for each modifiable parameter of the variable additional voltage, which means that at least 16 different values are accessible for each parameter.

The inventors observed that by modifying a single parameter of the supply voltage, even randomly, for example the value of the fixed component, the feasibility limits of the attack can be pushed back. After a relatively long processing time, it is not impossible to determine the functioning or the secrets of the logic circuit 2. An equivalent situation can be obtained by modulating only the frequency F or only the amplitude VA of the additional voltage, although this modulation is more efficient than for the value of the fixed component.

By modulating the fixed component and the periodic component and preferably at least two electrical characteristics of the periodic component, it is more difficult with present-day techniques to correlate the power consumed by the logic circuit 2 and processing of data by this same logic circuit 2.

The inventors observed that to enhance the security of the integrated circuit 1, it is particularly advantageous for the number generator 4 and logic circuit 2 to be physically protected against external aggressions. For example, these two components are protected by an electrical shield (not shown) which stops operation and/or the secrets of the integrated circuit 1 when the shield is corrupted. By integrating these two components within the integrated circuit 1, it is more difficult for a potential intruder to prevent modulation of the power supply conditions.

It is advantageous to protect the processing circuit 5 by means of the shield. The latter in fact receives the numbers and transforms them into operating conditions of the voltage generator 3 for the noise signal.

It is advantageous to protect the voltage generator 3 by the shield so that a potential intruder is not able to measure the delivered voltage precisely. In one embodiment, the processing circuit 5 is integrated in the voltage generator 3. However, it can also be envisaged to physically dissociate the voltage generator 3 and the processing circuit 5 so as to dissociate the actions and complicate the task of analysing the general operation of the integrated circuit 1.

It also appears very advantageous to provide for the voltage generator 3 which delivers the minimum operating voltage and the variable additional voltage to be supplied by a line-side power supply 6. The voltage generator 3 comprises a group of power supply connectors designed to be connected to a power supply 6 feeding the voltage generator 3.

The voltage generator 3 is configured to deliver a random voltage supplying the logic circuit and possibly the number generator 4. The variability in the power supply conditions will modulate the operation of the logic circuit 2 and of the number generator 4 which will in addition introduce a variability on the current consumption. Under these conditions, it becomes particularly difficult to study the power consumed by the power source 6 to be able to identify the operation of the logic circuit 2 and to at least partially deduce its operation therefrom.

In particularly advantageous manner, the number generator 4 is supplied by the voltage generator 3 so that the consumption of the number generator 4 disrupts the electrical consumption of the integrated circuit. It is then more difficult or even impossible to guess the number or numbers delivered by the number generator 4. In so far as the power supply conditions are fluctuating at the terminals of the number generator 4, it is particularly advantageous to provide for the number generator 4 to be engineered using asynchronous logic. It is also particularly advantageous to provide for the emission frequency of the numbers by the generator 4 to be at least partially defined by the voltage present at the terminals of the generator 4. In this way, by modifying the voltage at the terminals of the number generator 4 by means of the power supply conditions provided by the voltage generator 3, it is possible to vary the time separating two consecutive emissions of numbers at least as a function of the value of the previous number emitted.

As indicated in the foregoing, the processing speed of the data in the logic module 2 is partly dependent on its power supply conditions. By monitoring the speed of execution of the logic circuit, it is possible to roughly deduce the power supply conditions which provides a first indication. In order to prevent a possible correlation, it is advantageous to use a logic circuit 2 which is provided with a delay generator also called delay insertion circuit. The delay generator is configured to dissociate the total processing time of data by the logic circuit 2 and the power supply conditions of the logic circuit 2.

The delays can be random or the delay time can be a function of the power supply conditions. In preferential manner, the added delay time is random and is not correlated to the mean voltage at the terminals of the logic circuit 2.

The delay insertion circuit can comprise one or more RS latches associated with logic NAND gates as proposed in the document U.S. Pat. No. 7,205,794. It is further possible to provide for the delay insertion circuit to be configured to skip clock cycles as proposed in the document U.S. Pat. No. 6,327,661 when the logic circuit is a synchronous circuit.

In another particular embodiment, the delay insertion circuit can comprise a Muller gate and a plurality of delay circuits connected in series to an output of the Muller gate, between the signal input I and output O. Each delay circuit comprises an output connected to a corresponding input of a multiplexing circuit. An output of the multiplexing circuit forms the output of the delay insertion circuit. The Muller gate comprises an input forming the input of the delay insertion circuit and an input connected to the output of the last delay circuit by means of an inverting gate. Such an embodiment is described in the document US 2009-0307516.

In an embodiment that is advantageous as it is easy to implement, the voltage generator 3 comprises a Low-Drop-Out voltage regulator also called LDO, standing for Low Drop-Out regulator, or a DC-DC chopper which delivers at least a part of the voltage supplying the logic circuit 2.

It is particularly advantageous to use an LDO as this linear DC voltage regulator is able to regulate its output voltage even when the voltage demand is very close to what can be supplied. LDOs are generally associated with a low power supply noise which is a disadvantage in the present application. In order to be able to deliver the required variable voltage, a voltage modifier is connected on output of the LDO.

In advantageous manner, the voltage generator 3 comprises a low-dropout regulator provided with a first transistor 7. The first transistor has an input electrode designed to be connected to a power source 6 and an output electrode connected to supply the first logic module 2. The first transistor 7 has a control electrode connected to the output of amplifier 8 which delivers a periodic signal. The amplifier 8 has a first input terminal receiving a periodic signal from a periodic signal generator which is configured to modulate a frequency of said periodic signal by means of a first data item NF. This first data item NF is formed by a number of the generator 4 or it is representative of a number of the generator 4.

The periodic signal generator is configured to modulate an amplitude of the periodic signal by means of a second data item NA. This second data item NA is formed by a number of the generator 4 or it is representative of a number of the generator 4.

The amplifier 8 has a second input terminal receiving a voltage that is a function of a third data item NO. This third data item NO is formed by a number of the generator 4 or it is representative of a number of the generator 4. The third data item enables the offset voltage of the signal delivered by the first transistor 7 to be modulated.

Figure 2:
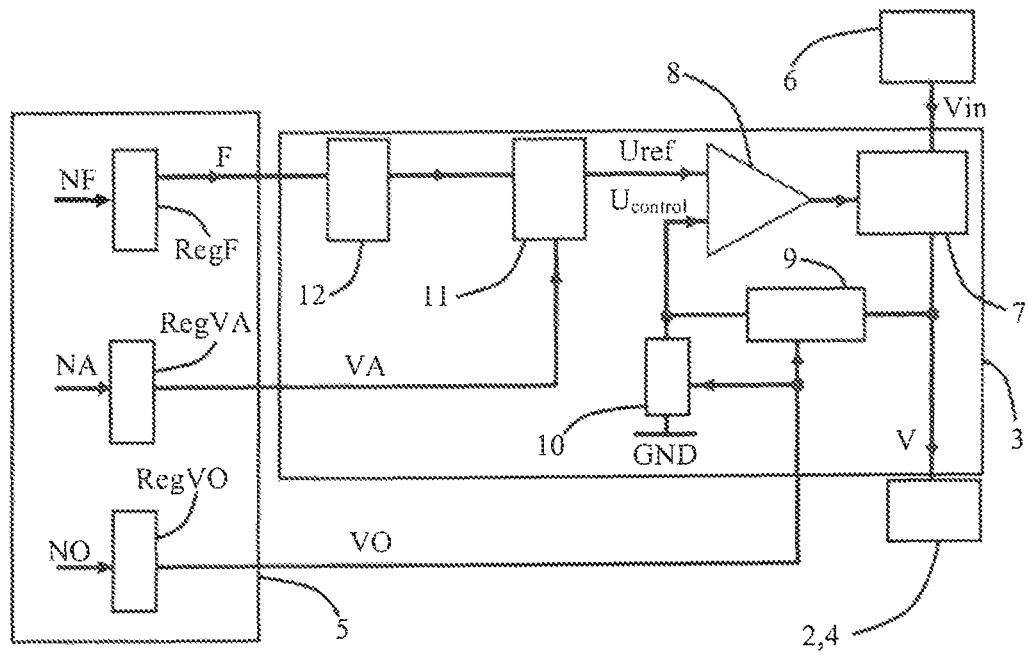
FIG. 2 represents a more particular embodiment of an electronic circuit according to the invention, in schematic manner.

In the more particular embodiment which is illustrated in FIG. 2, the voltage generator 3 comprises a first transistor 7 which is advantageously a power transistor. The first transistor 7 receives the supply voltage Vin from the power source 6 on a first electrode. The first transistor 7 delivers on output the supply voltage V which supplies the logic circuit 2 and advantageously the generator 4.

The control electrode of the first transistor 7 is connected to the output terminal of an amplifier 8. In this way, according to the signal emitted by the output terminal of the amplifier 8, the first transistor 7 delivers a more or less high voltage V on its output terminal.

The amplifier 8 comprises a first input terminal which receives a periodic voltage $U_{ref}$ or data relative to a periodic voltage.

The amplifier 8 comprises a second input terminal which receives the control voltage $U_{control}$ which defines the value of the offset voltage. For example, the voltage $U_{control}$ is supplied by a divider bridge formed by a first variable resistance 9 and a second variable resistance 10. This set of two variable resistances in series is connected on one side to the output terminal of the first transistor 7 and on the other side to a reference voltage, for example ground GND in FIG. 2.

The node common to the two variable resistances 9 and 10 delivers the voltage $U_{control}$ and is connected to the second input terminal of the amplifier 8.

The two variable resistances each have a control electrode configured to make the value of the resistance vary according to the signal applied on the control electrode.

The two control electrodes receive the signal VO which modifies the value of the electrical resistance. The signal VO is provided by the processing circuit 5 and defines the value of a fixed voltage component delivered on the output signal.

In the illustrated embodiment, the signal VO is delivered by a register RegVO from previous data NO which can come from the processing circuit 5 or from the number generator 4 depending on the embodiments.

The voltage $U_{ref}$ present on the first input terminal of the amplifier 8, is delivered by the output terminal of a branch limiting circuit 11. The branch limiting circuit 11 delivers a periodic signal on its output terminal.

The branch limiting circuit 11 has a first input terminal which receives a first periodic frequency signal F. The branch limiting circuit 11 has a second input terminal which receives a signal VA. The branch limiting circuit 11 is configured so that the value of the signal VA defines the amplitude of the periodic component delivered on its output terminal, i.e. the amplitude of the signal $U_{ref}$. In this way, if the value of the signal VA changes at each period, the amplitude of the signal $U_{ref}$ is modified at each period but the general form of the signal is preserved. The same is the case for the periodic component of the voltage V.

A periodic signal generator 12 is used and the output terminal of this generator 12 is connected to the input terminal of the branch limiting circuit 11. The periodic signal generator 12 has an input terminal which receives at least a signal F. The periodic signal generator 12 is configured so that the value of the frequency of the periodic signal delivered is modified according to the value of the signal F received on its input terminal.

A simple embodiment of the periodic signal generator 12 can be a Voltage Controlled Oscillator (VCO) which enables a periodic signal to be generated with a frequency which varies according to the value of the voltage applied on its input terminal, i.e. according to the signal F.

The periodic signal generator 12 can naturally be more complex so as to be able to provide different waveforms according to the value of the number emitted by the number generator 4.

In the same way as for the signal VO, the embodiment illustrated in FIG. 2 shows that the signals VA and F originate respectively from two different registers RegVA and RegF which previously receive the signals NA and NF. These signals NA and NF can come from the processing circuit 5 or from the number generator 4.

For example, it is possible for one of the signals NF, NA and NO to come from the number generator 4 and for the other two to come from the processing circuit 5. It is further possible for the same signal coming from the number generator 4 to be applied to the different registers so that emission of a number by the number generator 4 results in a modification of the conditions on the different parameters of the variable additional voltage.

It is even further possible to provide for the registers to have identical data so that two different data items emitted by the number generator 4 do not result in modification of all the parameters of the variable additional voltage. In other words a register can have at least two identical data items in its memory.

What is indicated in the embodiment of the voltage generator 3 with an LDO is also true in the following embodiment for a voltage generator 3 which comprises a DC-DC chopper or DC-DC converter.

Figure 3:
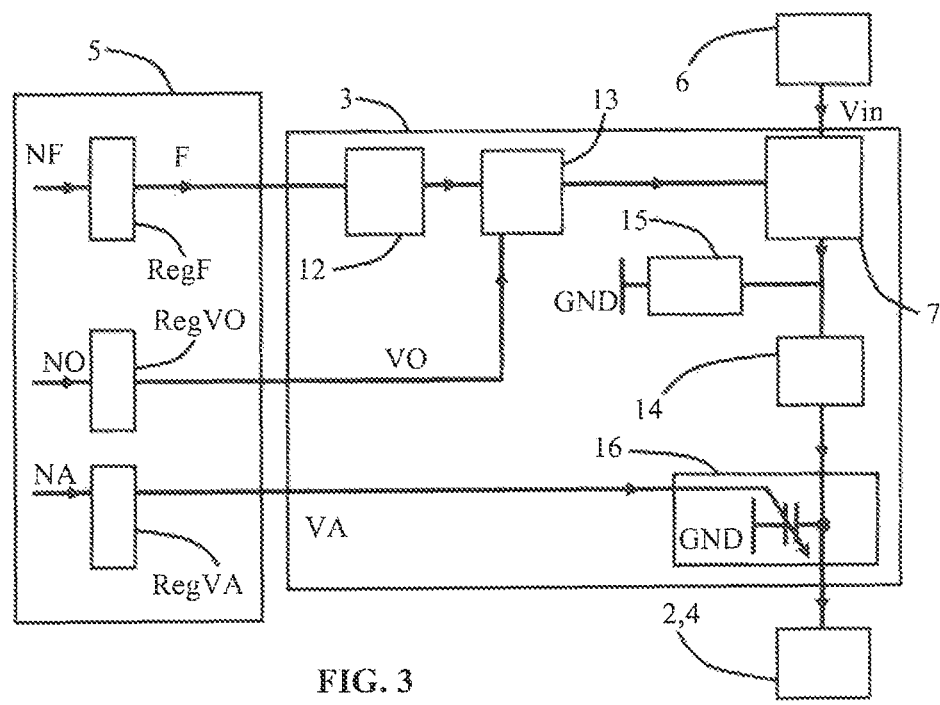
FIG. 3 represents another more particular embodiment of an electronic circuit according to the invention, in schematic manner.

An embodiment of a voltage generator 3 provided with a DC-DC chopper is illustrated in FIG. 3.

The voltage generator 3 comprises a DC-DC chopper provided with a first transistor 7 having an input terminal designed to be connected to a power source 6 and an output terminal connected to supply the first logic module 2. The first transistor 7 has a control electrode connected to the output of a periodic signal generator which is configured to modulate a frequency of said periodic signal by means of a first data item NF and a mean voltage of said periodic signal by means of a second data item NO. The first and second data items can be numbers emitted by the generator or data representative of these numbers. The output terminal of the first transistor 7 is connected to the first logic module 2 by means of a filter 16 configured to modulate the amplitude of the voltage delivered by the first transistor 8 by means of a third data item NA received on a control terminal of the filter 16. The third data item can be a number emitted by the generator 4 or data representative of this number.

In a more particular embodiment illustrated in FIG. 3, the voltage generator 3 comprises a first transistor 7 which is advantageously a power transistor. The first transistor 7 receives the supply voltage Vin provided by the power source 6 on a first electrode. The first transistor 7 delivers on output the output signal which is designed to supply the logic circuit 2.

The control electrode of the first transistor 7 is connected to the output terminal of a periodic signal generator 13. In this way, according to the periodic signal emitted by the output terminal of the generator 13, the transistor 7 delivers a periodic voltage on its output terminal.

The generator 13 comprises a first input terminal which receives a periodic signal and preferentially a periodic AC signal. The generator 13 comprises a second input terminal which receives a signal VO. The generator 13 is configured to modulate the value of the duty cycle of the periodic signal present on the first input terminal according to the value of the signal VO present on the second input terminal.

In this configuration, by modulating the value of the duty cycle, the voltage generator 3 is able to modulate the mean value of the signal delivered by the generator 13 which corresponds to the offset voltage VO of the fixed voltage component supplying the logic circuit 2.

In the illustrated embodiment, the signal VO is delivered by a register RegVO from a previous data item NO which can originate from the processing circuit 5 or from the number generator 4 depending on the embodiments.

The generator 13 modulating the value of the duty cycle has a first input terminal which receives a first periodic frequency signal F. A periodic signal generator 12 is used to generate this signal and the output terminal of this generator 12 is connected to the input terminal of the generator 13 modulating the value of the duty cycle.

The periodic signal generator 12 has an input terminal which receives at least a signal F. The periodic signal generator 12 is configured so that the frequency value is modified according to the value of the signal F received on its input terminal.

A simple embodiment of the periodic signal generator 12 can be a Voltage Controlled Oscillator (VCO) which generates a periodic signal having a frequency F which varies according to the value of the voltage applied on its input terminal.

Naturally, the periodic signal generator 12 can be more complex so as to be able to provide different waveforms according to the value of the number emitted by the number generator 4. However, the use of this functionality is less advantageous than in the previous embodiment.

The output terminal of the first transistor 7 is connected to an induction coil 14 so as to shape the signal on output from the transistor 7.

The connection between the first transistor 7 and the induction coil 14 is also connected to a first terminal of a diode 15. The second terminal of the diode 15 is connected to a reference voltage, for example ground GND in FIG. 3.

By means of the diode 15 and inductor 14, the signal delivered by the first transistor 7 is modified and shaped. On output from the inductor 14, the signal delivered is a periodic signal which comprises a fixed component defined by the duty cycle and therefore by the signal VO, and a periodic component having a frequency F which is defined by the periodic signal generator 12 and therefore by the value of the signal F.

If the transistor 7 delivers a square signal on its output terminal, the inductor 14 and diode 15 perform shaping of the signal for example in the form of a logarithmic wave function. If the transistor 7 delivers a signal different from a square signal, the form of the wave function will be different. It is then possible to change the form of the wave function by slightly changing the operating mode of the transistor 7.

The amplitude of the signal delivered by the inductor 14 is then modified by the filter 16 which is configured to make an amplitude value vary.

The output terminal of the inductor 14 is connected to a first input of a filter 16. The filter 16 has a second input which receives the signal VA. The filter 16 has an output terminal which supplies the logic circuit 2. For example purposes, the filter 16 is a low-pass filter, for example an LC filter comprising a capacitor. A particular embodiment is illustrated in FIG. 3. In this particular configuration, the filter 16 comprises a capacitor having a variable electric capacitance. The filter 16 can be formed by a capacitor having one terminal connected to the inductor and to the logic circuit 2 or to the number generator and one terminal connected to a reference voltage, for example ground. The value of the signal VA is applied to the control terminal of the capacitor in order to modulate its electric capacitance thereby modifying its behaviour.

The filter 16 is configured in such a way that the value of the signal VA applied to the second input modulates the amplitude value of the periodic component of the signal delivered by the inductor 14.

By modifying the value of the signal VA, it is possible to modify the amplitude value of the periodic component of the signal V supplying the logic circuit 2 and possibly the number generator 4.

This configuration is particularly advantageous, as the filter 16 which delivers the voltage supplying the logic circuit 2 does not have to present high performances. Less stringent requirements on the performances of the filter 16 enable a more compact filter to be formed and the possible manufacturing uncertainties add an additional unknown to the variable component of the power supply of the logic circuit 2.

This configuration enables the different components of the supply voltage to be easily modulated by means of the signals F, VO and VA.

In an advantageous embodiment, the number generator 4 is engineered using asynchronous logic and preferentially asynchronous logic insensitive to delays. In this way, the performances of the number generator 4 are not disrupted by the fluctuations introduced by the voltage generator 3 which improves the ruggedness of the integrated circuit 1. It is even advantageous to supply the number generator 4 with the voltage generator 3 as this introduces an additional unknown in operation of the number generator 4. This unknown acts on the period separating emission of two successive numbers or two successive series of numbers and not on the ruggedness of the generator to provide numbers.

If the number generator 4 and logic circuit 2 are engineered using asynchronous logic and preferentially asynchronous logic insensitive to delays, the integrated circuit 1 does not have a clock signal performing synchronisation of the logic circuit 2 and number generator 4.

The integrated circuit 1 preferentially has an asynchronous logic circuit which makes fabrication of the integrated circuit easier. It is however possible to use a synchronous logic circuit.

Figure 4:
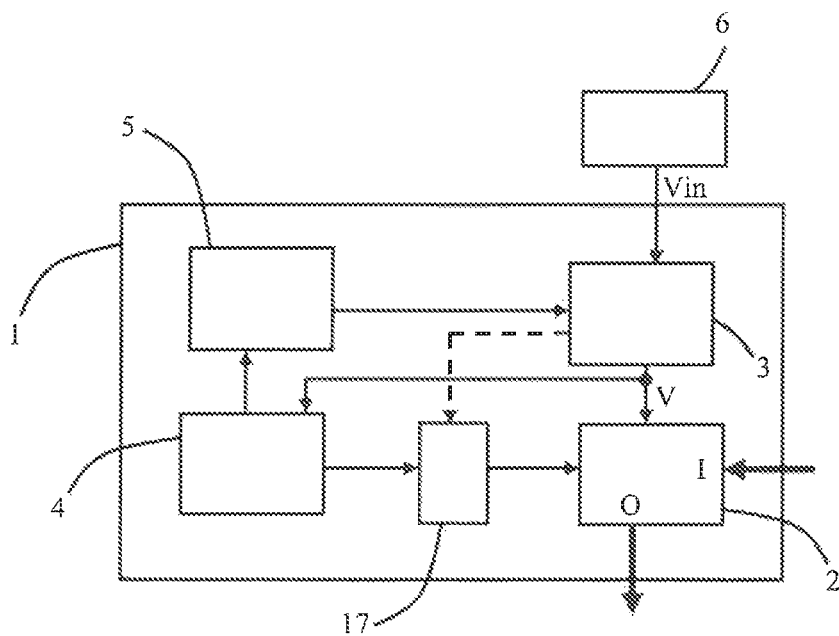
FIG. 4 represents another more particular embodiment of an electronic circuit according to the invention with a synchronous logic block, in schematic manner.

When the logic circuit is a synchronous circuit as illustrated in FIG. 4, the fluctuations of the power supply conditions have an influence on synchronisation of the functions.

The synchronous logic circuit 2 is configured so as to present operation insensitive to the fluctuations of the supply voltage which also involves providing operation insensitive to the fluctuations of the frequency of the synchronisation clock of the circuit as the latter is supplied by the voltage generator 3.

The logic circuit 2 comprises a clock generator 17 which is configured to generate a synchronisation clock signal of the different functions of the logic circuit 2. As an alternative, the clock generator 17 is dissociated from the logic circuit 2.

The clock generator 17 is connected to the number generator 4 so as to receive the numbers emitted by the generator 4 and/or the first series of successive data representative of the series of first numbers. The clock generator 17 is configured to modulate the frequency of the clock signal according to the numbers emitted by the number generator 4 so as to take account of the fluctuations of the voltage supplying the logic circuit 2.

In this exemplary case, the clock generator 17 directly receives the numbers emitted by the number generator 4. As an alternative, the clock generator 17 receives the data coming from the processing circuit either directly from the processing circuit 5 or from the voltage generator 3. It is further possible to provide for the voltage generator 3 or the processing circuit 5 to provide additional data indicating the frequency to be delivered by the clock generator 17.

For example purposes, it is possible to easily adjust the frequency of the clock signal using a plurality of inverters connected in series, there being an odd number of inverters, for example at least three inverters. The last inverter of the series delivers the clock signal. The output of the last inverter is connected to the input of the first inverter.

Modulation of the clock frequency can be obtained very easily by making the supply voltage of the inverters fluctuate. In this configuration, it is apparent that the oscillation frequency of the clock is directly a function of the number of inverters with a formula of the following form:

$$F_{osc}=0.5*T_d*N$$

with $T_d=K*V_{dd}/(V_{dd}-V_{th})^2$

N: the number of inverters
$V_{dd}$: the supply voltage of the inverters
$V_{th}$: the threshold voltage of the transistors
K: a constant representative of the technology used to form the inverter.

It is therefore possible to easily link the frequency of the clock signal to the power supply conditions.

The devices and methods of the prior art propose to vary a single power supply parameter according to a randomly generated number. If the random number generator malfunctions and is not perfectly random, if a modification of its external environment enables numbers to be generated in less random manner and/or if the intruder is able to determine/guess the value of the number, it is then possible to test the circuit for a fixed or quasi-fixed value of the number random. The conditions of the circuit are then identical between the different tests and it is possible to attack a circuit which is always in the same conditions.

According to the same logic, when a circuit is supplied with a purely sinusoidal voltage, it is advantageous to attack the circuit always at the same moment of the sine wave so as to circumvent the disruption. This method of attack is facilitated by the progression of "machine learning" which facilitates detection of a power supply of sine wave type and makes it possible to attack the circuit always at the same moment of the power supply sine wave. It is then possible to perform a large number of attacks and to observe the results to deduce tendencies and to guess the functionalities which are intended to be hidden.

On the contrary, according to the invention, several parameters of the power supply conditions are modified in time so that it is very difficult or even almost impossible to attack a circuit which has a periodic voltage with a first frequency F and a first amplitude VA in association with a fixed voltage value defined by the value of an offset voltage VO, these three parameters being able to vary according to random numbers.

The invention claimed is:

1. Electronic circuit comprising:
   a first logic circuit configured to perform a first function,
   a number generator configured to generate at least one series of successive first numbers over a first time period,
   a voltage generator connected to the number generator so as to receive a first series of successive data representative of the series of first numbers, the voltage generator being configured to supply the first logic circuit with a first supply voltage higher than a minimum operating voltage of the first logic circuit and to supply a variable additional second voltage having electrical characteristics that are functions at least of the first series of successive data,
   wherein the variable additional second voltage comprises at least:
      a component representative of a fixed voltage defined by an offset voltage value,
      a component representative of a first periodic voltage defined at least by a first frequency and a first amplitude,
   wherein the voltage generator is configured in such a way that the offset voltage value, the first frequency and/or the first amplitude are defined at least from the series of first numbers, over the first time period, taken from a first series of offset voltages comprising several different offset voltage values, a second series of first frequencies comprising several different first frequency values and a third series of first amplitudes comprising several different first amplitude values, and
   wherein the voltage generator is configured to deliver a component representative of the first periodic voltage which presents a first waveform different from a second waveform of the component representative of the second periodic voltage, the first waveform and second waveform being advantageously chosen from a sinusoidal signal, a square signal, a triangular signal, a trapezoid signal, a saw-tooth signal, an exponential signal and a logarithmic signal.

2. Electronic circuit according to claim 1, wherein the voltage generator is configured to deliver the variable additional second voltage which further comprises a component representative of a second periodic voltage defined at least by a second frequency and a second amplitude and wherein the voltage generator is configured in such a way that the second frequency and/or the second amplitude are defined at least from the series of first numbers, over the first time period, taken from several second frequencies and second amplitudes.

3. Electronic circuit according to claim 2, wherein the voltage generator is configured in such a way that the component representative of the first periodic voltage presents a phase shift with the component representative of the second periodic voltage and wherein the voltage generator is configured in such a way that a value of the phase shift is defined at least from the series of first numbers, over the first time period, taken from several phase shift values.

4. Electronic circuit according to claim 1, wherein the voltage generator is configured to deliver a component representative of the first periodic voltage which presents a first duty cycle and wherein the voltage generator is configured so that the first duty cycle is defined at least from the series of first numbers, over the first time period, taken from several different duty cycles.

5. Electronic circuit according to claim 1, wherein the first series of offset voltages comprises a zero value or the third series of first amplitudes comprises a zero value.

6. Electronic circuit according to claim 1, wherein the number generator is supplied by the voltage generator and wherein the first supply voltage is higher than a minimum operating voltage of the number generator.

7. Electronic circuit according to claim 1, wherein the number generator is connected to a register configured to transform a number received from the number generator into an address of a memory area storing one or more of the electrical characteristics of the variable additional second voltage.

8. Electronic circuit according to claim 1, wherein the number generator is a random number generator.

9. Electronic circuit according to claim 1, wherein the number generator is engineered using asynchronous logic.

10. Electronic circuit according to claim 9, wherein the number generator is engineered using asynchronous logic insensitive to delays or almost insensitive to delays.

11. Electronic circuit according to claim 1, wherein the number generator is configured so that a time period separating emission of two successive numbers is a function of power supply conditions applied on the power supply terminals of the number generator.

12. Electronic circuit according to claim 1, wherein the first logic circuit is provided with a delay generator configured to insert a delay in data processing by the first logic circuit so as to dissociate the total processing time of said data and power supply conditions of the first logic circuit.

13. Electronic circuit according to claim 1, comprising a clock generator configured to generate a clock signal, the clock generator being connected to the number generator and/or to the voltage generator so as to receive data relative to the at least one series of successive first numbers generated by the number generator and to adjust a frequency of the clock signal to power supply conditions of a synchronous logic circuit synchronised by said clock signal, the first logic circuit comprising said synchronous logic circuit.

14. Electronic circuit comprising:
a first logic circuit configured to perform a first function,
a number generator configured to generate at least one series of successive first numbers over a first time period,
a voltage generator connected to the number generator so as to receive a first series of successive data representative of the series of first numbers, the voltage generator being configured to supply the first logic circuit with a first supply voltage higher than a minimum operating voltage of the first logic circuit and to supply a variable additional second voltage having electrical characteristics that are functions at least of the first series of successive data,
wherein the variable additional second voltage comprises at least:
a component representative of a fixed voltage defined by an offset voltage value,
a component representative of a first periodic voltage defined at least by a first frequency and a first amplitude,
wherein the voltage generator is configured in such a way that the offset voltage value, the first frequency and/or the first amplitude are defined at least from the series of first numbers, over the first time period, taken from a first series of offset voltages comprising several different offset voltage values, a second series of first frequencies comprising several different first frequency values and a third series of first amplitudes comprising several different first amplitude values, and
wherein the voltage generator comprises a low-dropout voltage regulator provided with a first transistor having an input terminal designed to be connected to a power supply source and an output terminal connected to supply the first logic circuit, the first transistor having a control electrode connected to an output of an amplifier, the amplifier having a first input terminal receiving a periodic signal from a periodic signal generator configured to modulate a frequency of said periodic signal by means of a first data item received on a first input terminal and an amplitude of said periodic signal by means of the second data item received on a second input terminal, the amplifier having a second input terminal receiving a voltage from a voltage supply source, the voltage supply source being configured to modulate a value of the delivered voltage according to a third data item.

15. Electronic circuit comprising:
a first logic circuit configured to perform a first function,
a number generator configured to generate at least one series of successive first numbers over a first time period,
a voltage generator connected to the number generator so as to receive a first series of successive data representative of the series of first numbers, the voltage generator being configured to supply the first logic circuit with a first supply voltage higher than a minimum operating voltage of the first logic circuit and to supply a variable additional second voltage having electrical characteristics that are functions at least of the first series of successive data,
wherein the variable additional second voltage comprises at least:
a component representative of a fixed voltage defined by an offset voltage value,
a component representative of a first periodic voltage defined at least by a first frequency and a first amplitude,
wherein the voltage generator is configured in such a way that the offset voltage value, the first frequency and/or the first amplitude are defined at least from the series of first numbers, over the first time period, taken from a first series of offset voltages comprising several different offset voltage values, a second series of first frequencies comprising several different first frequency values and a third series of first amplitudes comprising several different first amplitude values, and
wherein the voltage generator comprises a DC-DC chopper provided with a first transistor having an input terminal designed to be connected to a power supply source and an output terminal connected to supply the first logic circuit, the first transistor having a control electrode connected to an output of a periodic signal generator configured to modulate a frequency of said periodic signal by means of a first data item received on a first terminal and a mean voltage value of said periodic signal by means of a second data item received on a second terminal, an output terminal of the first transistor being connected to the first logic circuit by means of an inductor and a filter configured to modulate an amplitude of a voltage delivered by the first transistor by means of a third data item received on a control terminal of the filter.

* * * * *